United States Patent [19]
Caldwell et al.

[11] Patent Number: 5,289,365
[45] Date of Patent: Feb. 22, 1994

[54] MODULAR NETWORK CONTROL SYSTEM

[75] Inventors: David W. Caldwell; Nicholas W. Medendorp, both of Holland, Mich.

[73] Assignee: Donnelly Corporation, Holland, Mich.

[21] Appl. No.: 812,711

[22] Filed: Dec. 23, 1991

[51] Int. Cl.⁵ .................... G06F 15/46; G06F 15/56
[52] U.S. Cl. .................... 364/138; 340/310 R; 340/825.07; 364/492
[58] Field of Search ............ 364/138, 139, 140, 141, 364/131-133, 188, 189, 492, 493; 340/310 R, 310 A, 310 CP, 827, 825.06, 825.07, 825.21, 825.22, 825.29; 375/36; 307/147, 38-42

[56] References Cited

U.S. PATENT DOCUMENTS

| | | | |
|---|---|---|---|
| 4,124,887 | 11/1978 | Johnson et al. | 364/138 |
| 4,418,333 | 11/1983 | Schwarzbach et al. | 340/310 |
| 4,535,401 | 8/1985 | Penn | 364/132 |
| 4,567,557 | 1/1986 | Burns | 364/145 |
| 4,791,547 | 12/1988 | Petroff | 340/825.07 X |
| 4,792,731 | 12/1988 | Pearlman et al. | 315/316 |
| 4,847,781 | 7/1989 | Brown, III et al. | 364/492 |
| 4,847,782 | 7/1989 | Brown, Jr. et al. | 364/492 |
| 4,864,588 | 9/1989 | Simpson et al. | 375/1 |
| 4,899,129 | 2/1990 | MacFadyen et al. | 340/310 |
| 4,899,217 | 2/1990 | MacFadyen et al. | 358/86 |
| 4,910,658 | 3/1990 | Dudash et al. | 340/825.07 X |
| 4,947,278 | 8/1990 | Nichols, III | 361/46 |
| 5,033,112 | 7/1991 | Bowling et al. | 455/603 |
| 5,043,531 | 8/1991 | Cutenson et al. | 174/49 |
| 5,045,823 | 9/1991 | Nichols, III | 333/132 |
| 5,051,720 | 9/1991 | Kittirutsunetorn | 340/310 |
| 5,128,855 | 7/1992 | Hilber et al. | 364/132 |
| 5,153,572 | 10/1992 | Caldwell et al. | 340/712 |
| 5,157,273 | 10/1992 | Medendorp et al. | 307/147 |
| 5,164,609 | 11/1992 | Poppe et al. | 307/147 |

Primary Examiner—Joseph Ruggiero
Attorney, Agent, or Firm—Price, Heneveld, Cooper, DeWitt & Litton

[57] ABSTRACT

A module electrical control system for controlling office equipment includes a plurality of control modules interconnected with an input module via a system bus assembly. The input module includes an input-generating device, such as a keypad or the like, for generating an input signal, an output port to which the system bus assembly is connected and a circuit that is responsive to the input signal for supplying a command signal to the output port. The circuit includes a switch control unit that is responsive to a particular state of the input signal by producing a switched low voltage output signal and an address and command control until that is responsive to a particular state of the input signal by producing a particular value of a data signal. The system bus assembly includes at least two signal channels; one selectively supplied with the switched low voltage signal and the other selectively supplied with the data signal. Each control module is one of at least two types. A first type includes a control circuit that is responsive to the switched low voltage signal on the first signal channel in order to perform a control function on the load connected therewith. All control modules of the first type will respond concurrently to the switched low voltage signal. A second type of control module includes a control circuit that is responsive to a particular value of the data signal on a second signal channel uniquely assigned to that control module in order to perform a control function on the load connected therewith. Thus, modules of the second type will respond individually to the data signal.

31 Claims, 11 Drawing Sheets

MODULAR NETWORK CONTROL SYSTEM

BACKGROUND OF THE INVENTION

This invention relates generally to control systems for performing selective control functions on various loads and in particular to a control system that is modular in construction in order to provide flexibility in configuration. The invention is particularly adapted for use in an office environment.

In our patent with Robert P. Poppe for a CONTROLLABLE POWER DISTRIBUTION SYSTEM, issued Nov. 17, 1992, under U.S. Pat. No. 5,164,609, we disclose a modular power distribution system for use in individual work stations in which loads, such as plug strips and lighting fixtures, can be interconnected with a touch panel to provide touch control, from a desk top, of the electrical loads of a typical workstation. The individual modules in the system have input ports, which respond to an input signal in order to activate an associated load from a source of high voltage power, and output ports, which provide an output control signal whenever a control signal is being applied to the input port. In this manner, modules could be ganged in various combinations.

While the modular system disclosed in our U.S. Pat. No. 5,164,609 is a significant advancement over known systems, it is not without its limitations. It is limited to only ON/OFF control over the loads. In addition, the system lacks the ability to accept more than one input device and is unable to provide separate control to selective modules in the system.

Modular wiring systems have been proposed for use in "smart house" control schemes, such as that disclosed in U.S. Pat. No. 5,043,531 issued to Gutenson et al for a WIRING LAYOUT FOR USE IN CONSTRUCTING NEW HOMES. However, such systems address concerns that are not particularly salient in an office environment. Furthermore, the Gutenson et al wiring scheme is intended for permanent installation in the walls of a home during its construction and would be prohibitively bulky and unsightly if adapted to surface mounting in an office.

SUMMARY OF THE INVENTION

The present invention is intended to overcome the limitations of the prior art, and to provide a modular control system that is not only flexible in its adaptation to particular environments but which also provides flexibility in the architecture of the system. The invention facilitates the use of discrete module addressability and a virtually unlimited range of control functions for selective load control. The present invention is intended to accommodate various configurations of both loads and command input sources and interconnection schemes.

The invention is embodied in a modular network control system including at least one control module having an input port and control means responsive to a command signal at the input port for selectively performing a control function on a load. Such system further includes at least one input module having an input means for generating an input signal, an output port and circuit means responsive to the input signal for supplying a command signal to the output port. A system bus assembly is provided for interconnecting the output port of the input module with the input port of the control module. According to one aspect of the invention, the system bus includes at least two distinct signal channels and the input module circuit means selectively supplies the command signal to the control module as one of a switched low voltage signal applied to one of the signal channels and a data signal applied to the other signal channel. The control means may be a non-selective circuit that is connected with the switched low voltage signal channel or a selective circuit that is connected with the data signal channel. The non-selective circuit responds to the command signal to perform a control function. The selective circuit responds to the command signal to perform a control function provided that the command signal is encoded with an address that is assigned to that particular control means.

Another aspect of the invention provides an additional separate channel in the system bus assembly that is connected with a low voltage power supply, such that the control modules may be alternatively supplied with electrical energy from a source of high voltage power or from the low voltage power supply channel of the system bus assembly. Another aspect of the invention provides yet another separate channel in the system bus assembly to provide bidirectional data communication between the input module and the control modules.

Additional input modules may be provided. Each of the input modules may be capable of selectively supplying the command signal to any of the control modules. Particular control modules may include a manual switch means for selectively applying electrical energy from the source of high voltage power and wherein the control means selectively bypasses the manual switch means in response to the command signal. In this manner, the control module may be used as a stand-alone control device and operated by the manual switch means. The same control device, when connected with the system bus assembly, is controlled by the input module.

These and other objects, advantages and features of the invention will become apparent upon review of the following specification in conjunction with the drawings.

BRIEF DESCRIPTION OF THE DRAWINGS

FIG. 1b is an electrical schematic diagram illustrating in more detail a portion of the system in FIG. 1a;

FIG. 2 is a block diagram illustrating a first embodiment of the system in FIG. 1a;

FIG. 3 is a block diagram of a second embodiment of the system in FIG. 1a;

FIG. 6a is a block diagram of an alternative to the system in FIG. 1a;

FIG. 6b is an electrical schematic diagram illustrating in more detail a portion of the system in FIG. 1a.

DESCRIPTION OF THE PREFERRED EMBODIMENT

Figure 1A:
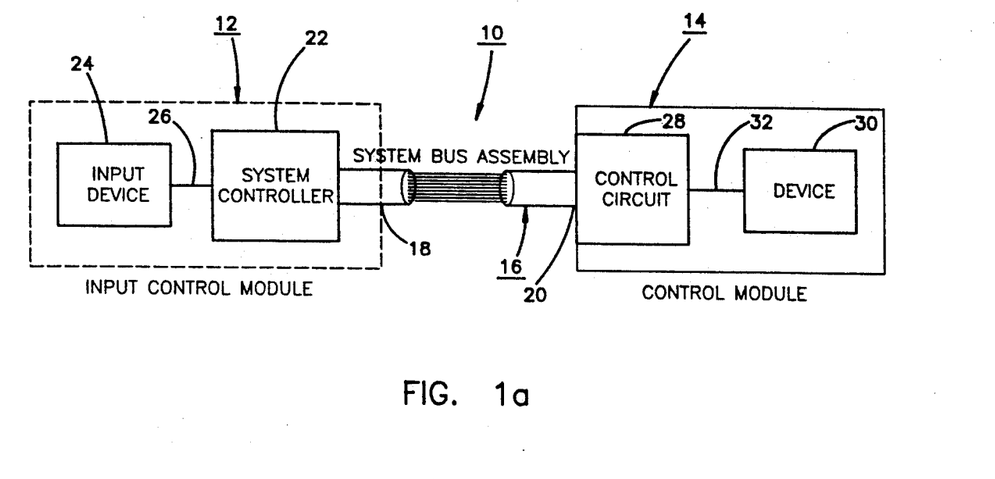
FIG. 1a is a block diagram illustrating a modular network control system according to the invention.

Referring now specifically to the drawings and the illustrative embodiments depicted therein, a modular network control system, generally indicated at 10, includes one or more input modules 12, one or more control modules 14 and at least one system bus assembly 16 (FIG. 1a). System bus assembly 16 interconnects an output port 18 of input module 12 with an input port 20 of control module 14. Output port 18 is driven by a system controller 22, which receives input command signals from an input device 24 over a line 26. The control module input port 20 is interconnected with a control circuit 28, which responds to commands transferred by system bus assembly 16, from system controller 22 in order to control a load 30, over an output line 32.

Figure 1B:
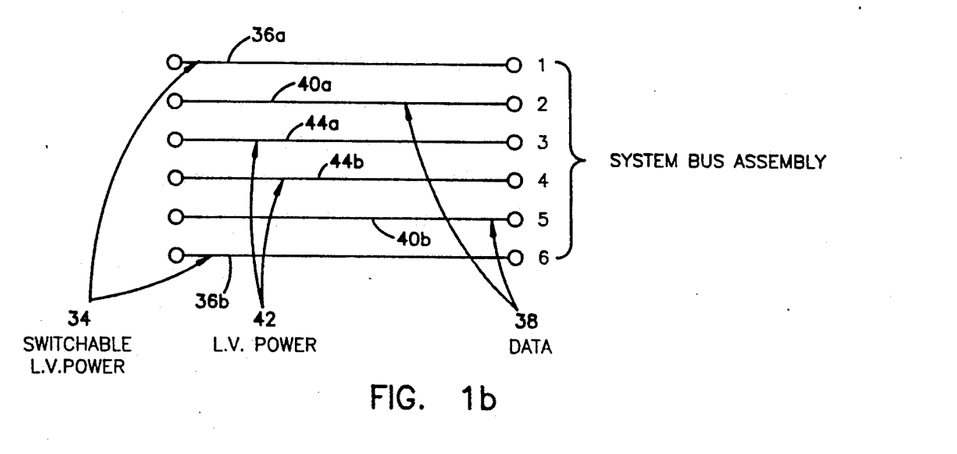

In the illustrated embodiment, input device 24 may be a two-selection, touch-responsive on/off keypad of the same general structure as that disclosed in commonly assigned U.S. Pat. No. 5,153,572, issued Oct. 6, 1992 to the present inventors for a TOUCH SENSITIVE CONTROL CIRCUIT the disclosure of which is hereby incorporated herein by reference. However, input device 24 may be a more complex device, having any number of alpha-numeric keys to receive a large number of possible input selections. In the illustrated embodiment, system bus assembly 16 is a three-channel, multiconductor, cable having a channel 34 defined by a pair of conductors 36a, 36b (FIG. 1b). Channel 34 is a switchable low voltage power channel which alternates states between the presence and absence of low voltage power across conductors 36a, 36b. System bus assembly 16 additionally includes a channel 38 defined by conductors 40a, 40b which provides a data communication channel in order to transmit digital data words from system controller 22 to particular control circuit 28, as will be set forth in more detail below. System bus assembly 16 additionally includes a channel 42 defined by conductors 44a, 44b for transferring low voltage electrical power from system controller 22 to particular ones of control circuit 28.

Control circuit 28 is capable of assuming a plurality of different configurations that are appropriate for the particular load 30 to be controlled, and other factors including the degree of control desired over the loads in the network control system. Control circuit 28 is interconnected with port 20, and hence, system bus assembly 16, and will thereby receive the electrical input from one or more of channels 34, 38 and 42. However, input port 20 has the same configuration, which is identical with the configuration of output port 18, irrespective of the particular structure of control circuit 28, so that system bus assembly 16 is uniform in structure and may be used in all portions of a network control system 10 having a plurality of input and/or control modules as will be set forth in more detail below. Accordingly, system bus assembly 16 needs to be supplied in only one standard configuration. System bus assembly 16 is made up of low voltage conductors and, hence, is exempt from the insulation, and other requirements, of the National Electrical Code applying to high voltage conductors. This allows system bus assembly 16 to be of a compact, flexible and relatively inexpensive construction.

In the embodiment illustrated in FIGS. 4A-4E, the flexible, modular nature of modular network control system 10 becomes apparent. System controller 22 is illustrated as including a switch control 46 and an address and command control 48. Switch control 46 produces an output on conductors 36a, 36b, which constitute switchable low voltage power channel 34. Address and command control 48 produces an output on conductors 44a, 44b, which constitute data channel 38. This output consists of an address word that is assigned to one or more particular control circuits 28 and a control word that specifies the control function that is to be performed by the control circuit(s) having the assigned address word. Switch control 46 and address and command control 48 receive supply voltage from output lines 50a, 50b of a low voltage DC power supply 52. Power supply 52, in turn, receives supply voltage from a plug connector 54 which is standard configuration for connecting with the line voltage power supply of an office, or like structure, which is typically 120/240 volts AC. Conductors 50a, 50b are connected directly with conductors 44a, 44b, which constitute low voltage power channel 42.

Figure 4A:
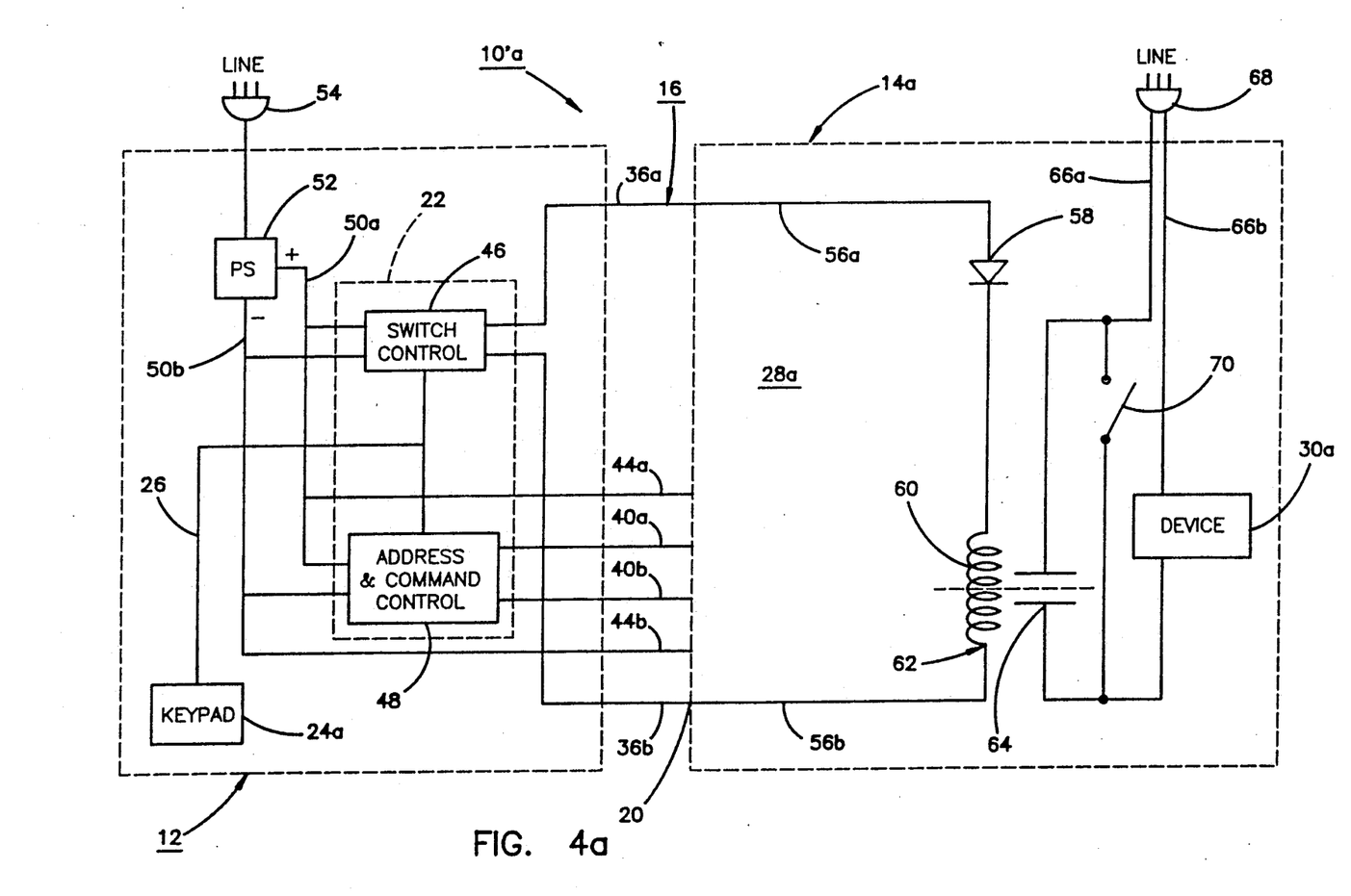
FIGS. 4A through 4E are schematic diagrams illustrating examples of control module circuit configurations useful with the invention.

One version of modular network control system, designated 10'a, includes a control module, designated 14a (FIG. 4A). Control module 14a includes a pair of conductors 56a, 56b extending from the appropriate contacts of input port 20 to connect the conductors with bus conductors 36a, 36b that constitute switched low voltage power channel 34. Conductors 56a, 56b, in turn, connect, through a diode 58, with the solenoid coil 60 of a low voltage relay 62. A pair of normally open contacts 64 of relay 62 selectively connect a high voltage power conductor 66a with a device, or load, 30a. Another high voltage power conductor 66b extends directly from plug 68 to load 30a. A manually actuatable toggle switch 70 is connected in electrical parallel with contact 64 and, in this manner, provides an alternative means for interconnecting power conductor 66a with load 30a.

The operation of modular network control system 10'a is as follows. Switch control 46 and address and command control 48 receive an input from keypad 24a. When the user indicates by the appropriate input to keypad 24a that the loads connected to all input modules 14a are to be actuated, or energized, switch control 46 responds by applying the low voltage output of DC power supply 52 across conductors 36a, 36b constituting the switchable low voltage power channel. While address and command control 48 may also respond to the selection entered at keypad 24a by sending address words and control words on data channel 38, the control module 14a in modular network control system 10'a, illustrated in FIG. 4A, does not respond to any output of address and command control 48 because there is no device connected with conductors 40a, 40b constituting data channel 38. Also, there is no connection in control module 14a with conductors 44a, 44b constituting the low voltage power channel. The voltage produced across conductors 36a, 36b by switch control 46 is applied to a solenoid coil 60 which causes relay 62 to close contacts 64 and apply the high voltage power connected with plug 68 directly to device 30a.

If control module 14a is not connected to system data link 16, it may be used in a stand-alone fashion. In the stand-alone mode, plug 68 is connected with a high voltage source, such as a line voltage power outlet. Manual toggle switch 70 is closed, by the user, whenever it is desired to activate load 30a and opened whenever it is desired to deactivate load 30a. In this manner, control module 14a is usable in a stand-alone fashion without the rest of the control system 10'a.

Figure 4B:
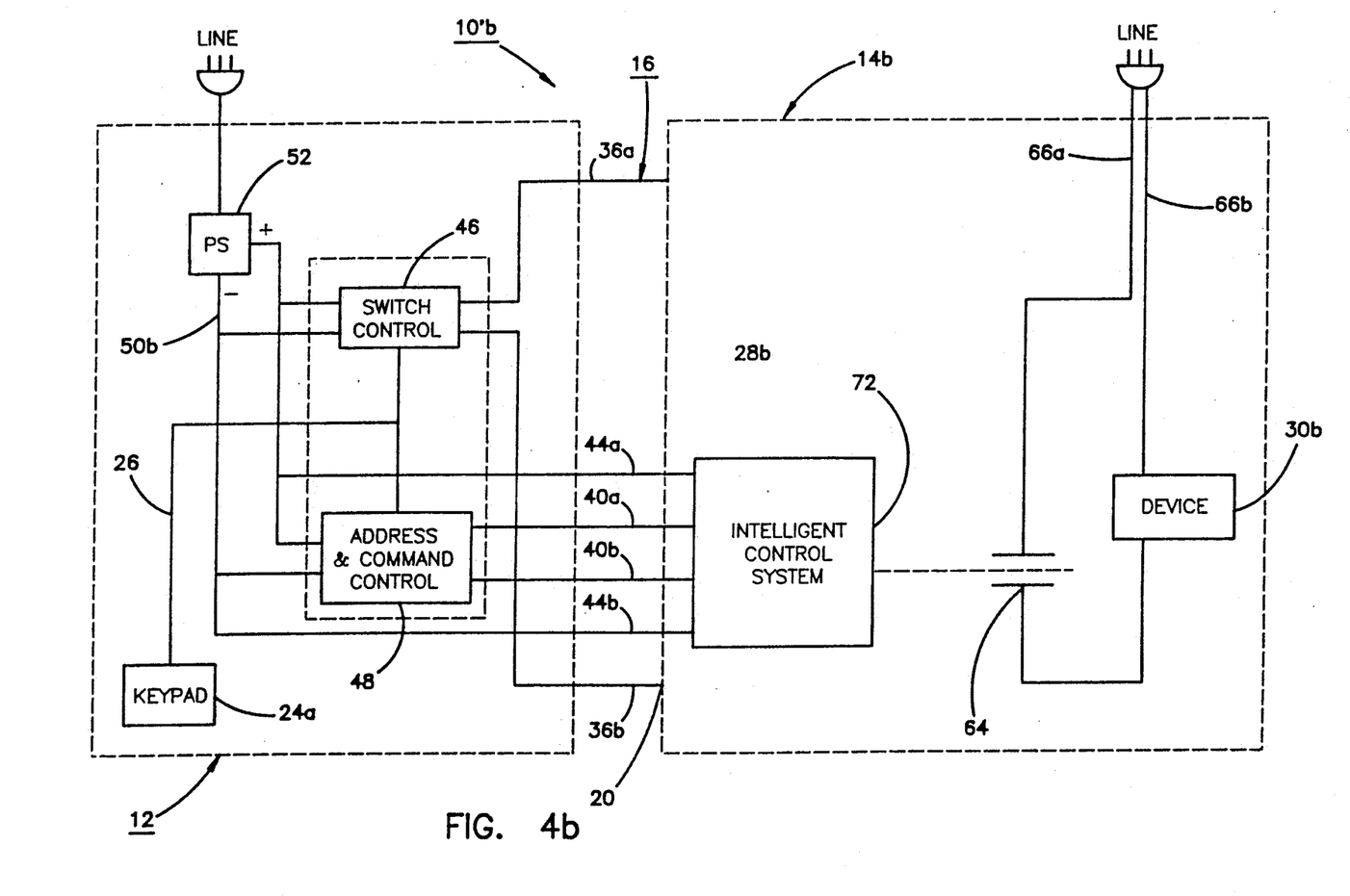

In another version of modular network control system 10'b, a control module 14b includes an intelligent control circuit 72 (FIG. 4B). Intelligent control circuit 72 is connected with the portion of input port 20 that connects with conductors 40a, 40b, which constitute data channel 38 and with conductors 44a, 44b which constitute low voltage power channel 42. Accordingly, intelligent control circuit 72 receives low voltage power from power supply 52 and a data signal from address and command control 48. Intelligent control circuit 72 responds to a data signal including the address word assigned to that control circuit by performing a control function corresponding to the control word in the data signal. The control function is illustrated as means for closing contacts 64 to apply high voltage power from conductor 66a to load 30b. In control module 14b, there is no connection with conductors 36a, 36b constituting switchable low voltage power channel 34. In operation, when the user enters an indication through keypad 24a that a particular control function is to be performed by the particular device 30b, address and command control 48 responds by encoding data channel 38 with the address of intelligent control circuit 72 associated with device 30b and the control word corresponding to the particular control function to be performed. In this manner, modular network control system 10'b is capable of selectively controlling individual loads 30b. Although the control function to be performed by intelligent control circuit 72 is illustrated as a switch closure, it could be a more complex function such as increasing or decreasing the level of power applied to the load, or the like. The connections in control module 14b with the low voltage power channel 42 provides the electrical power to operate intelligent control circuit 72. This avoids the necessity of a separate regulated voltage power supply in control module 14b.

Figure 4C:
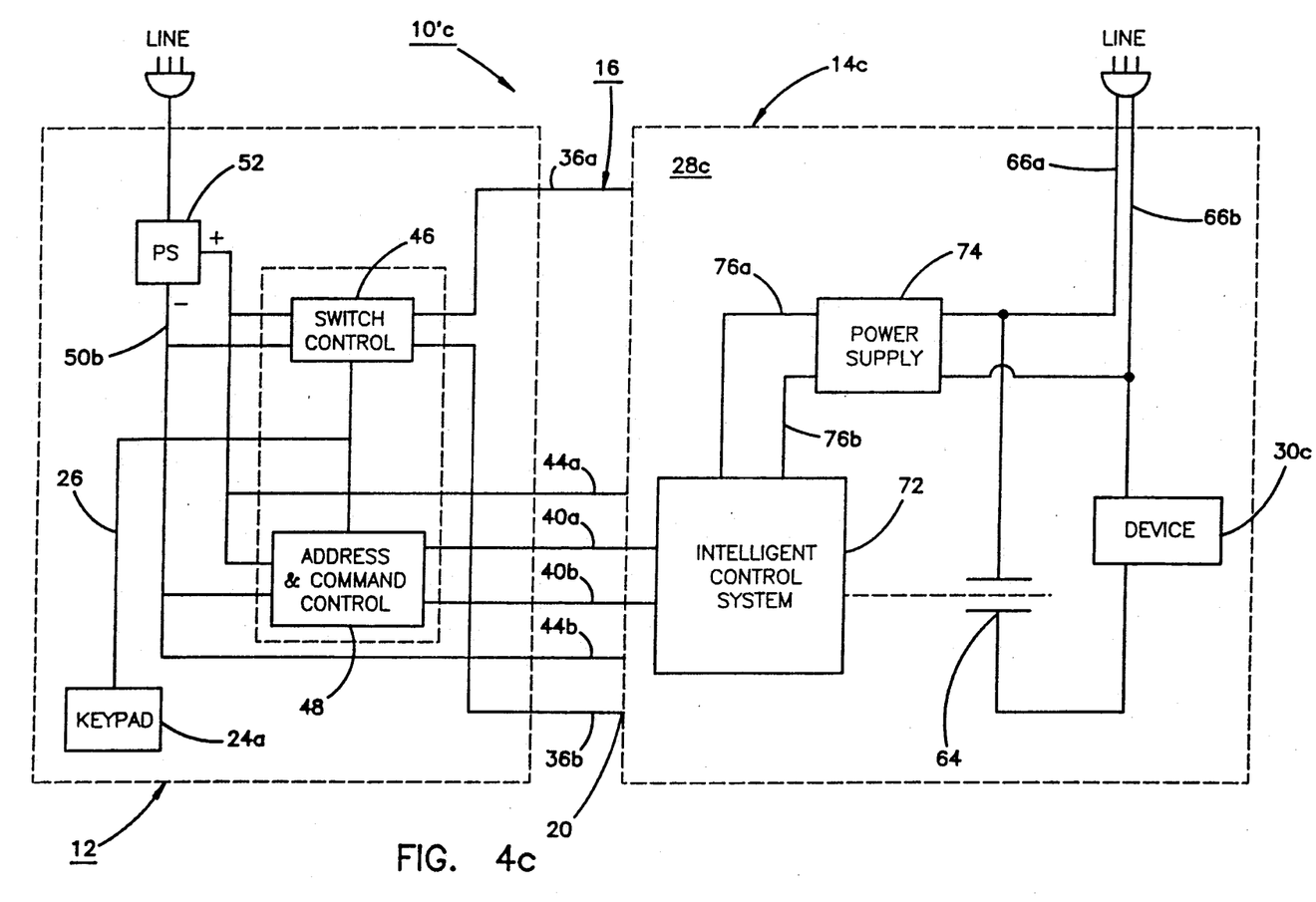

In the embodiment of modular network control system designated 10'c, illustrated in FIG. 4C, control module 14c includes a power supply 74 receiving an input from high voltage power conductors 66a, 66b and producing low voltage DC power on output conductors 76a, 76b connected with intelligent control circuit 72. The purpose of power supply 74 is to provide a supply of power to intelligent control circuit 72. Because the power to operate intelligent control circuit 72 is supplied by power supply 74, there are no connections in control module 14c connecting intelligent control circuit 72 with conductors 44a, 44b constituting low voltage power channel 42. Otherwise, control module 14c is the same as control module 14b.

Figure 4D:
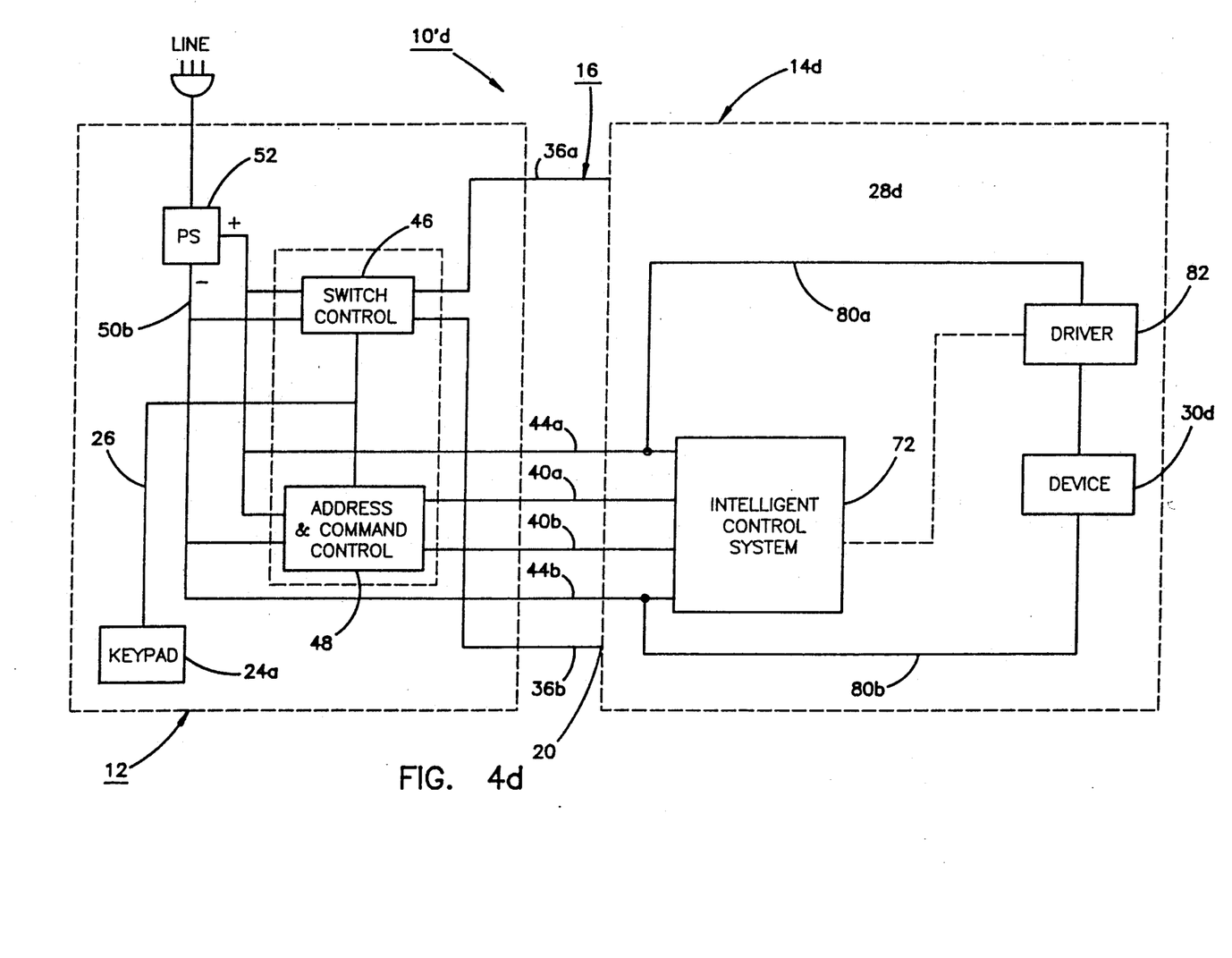

Modular network control system 10'd, illustrated in FIG. 4D, includes control module 14d in which control circuit 72 is connected with conductors 44a, 44b which constitute the low voltage power channel and conductors 40a, 40b which constitute the data channel. In addition, conductors 80a, 80b supply low voltage power from conductors 44a, 44b to device 30d through a device driver 82. A control function to be performed by control module 14d on device 30d is carried out by device driver 82 under the direction of intelligent control circuit 72 in response to the receipt of its assigned address and the appropriate control word over conductors 40a, 40b, which constitute the data channel 38. Control module 14d is useful, for example, as a lock actuator for a file cabinet, or the like, when it is desired to be able to supply appropriate control signals from input keypad 24a. There is no requirement for control module 14d to be located where there is access to a high voltage receptacle. Thus, it is seen that modular network control system 10' provides exceptional flexibility in configuring a control system.

Figure 4E:
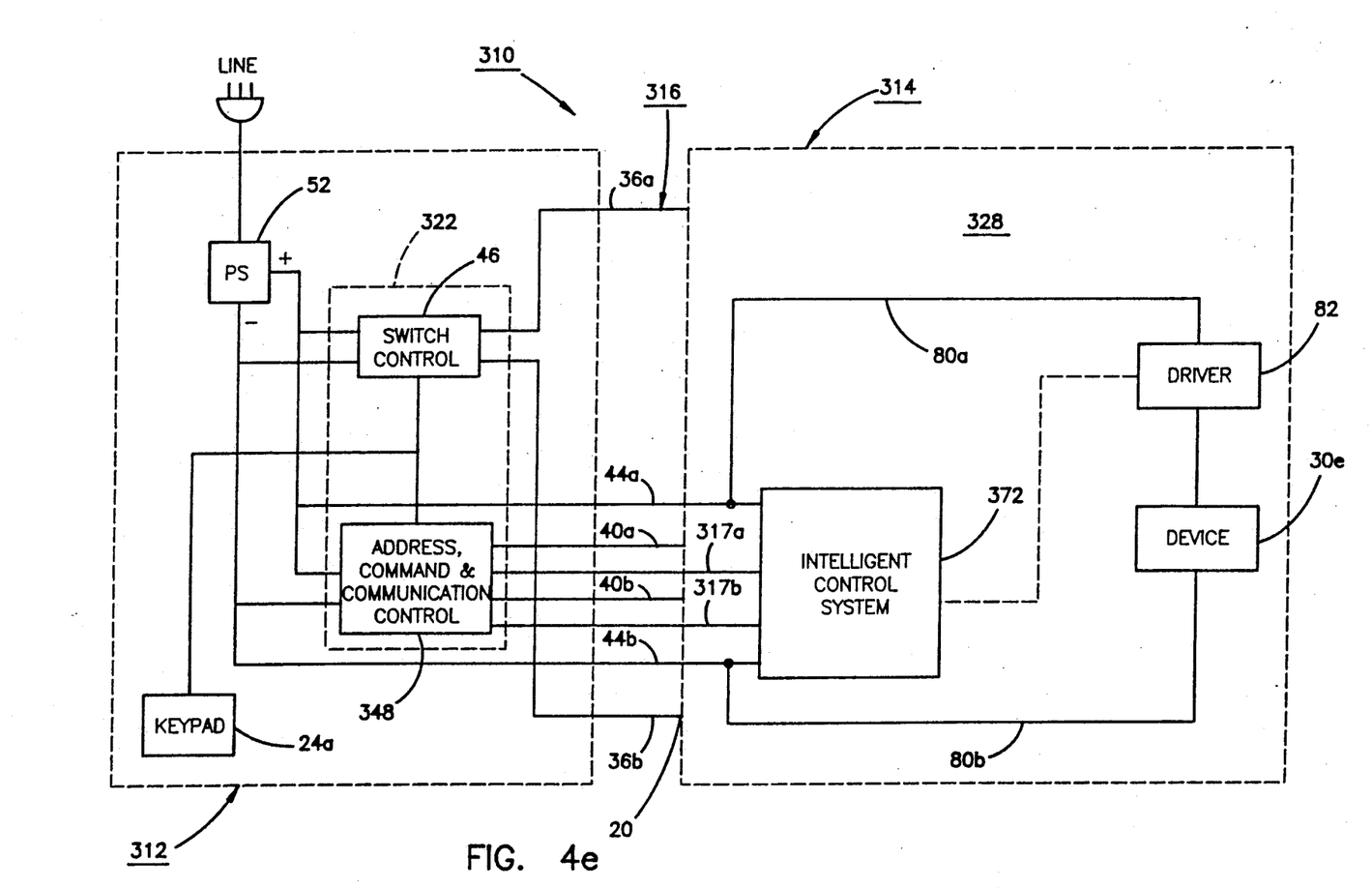
Figure 6A:
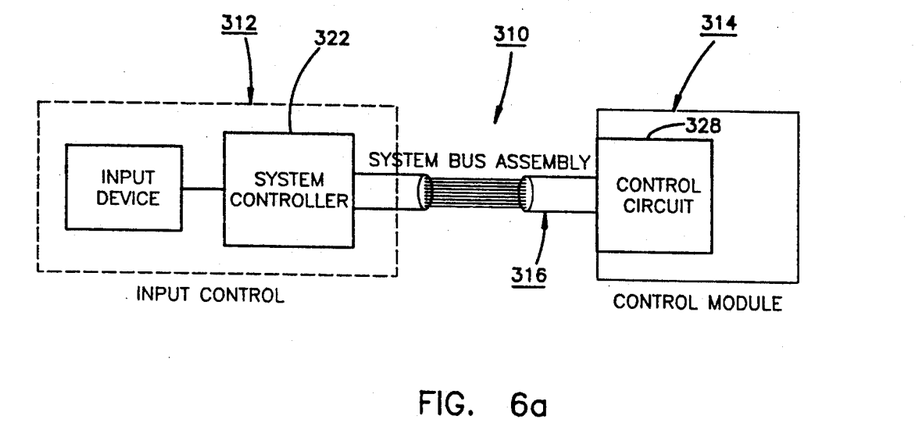
Figure 6B:
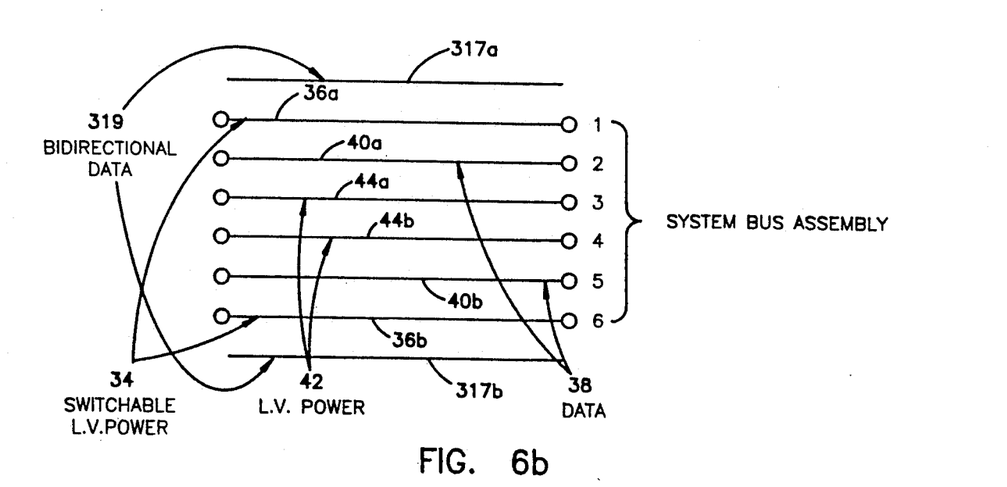

Modular network control system 310, illustrated in FIGS. 4E and 6A, include a control module 314 having a control circuit 328 that includes an intelligent control circuit 372 that is capable of bidirectional communication with an address, command and control module 348 in an input module 312. Module 348 and circuit 372 communicate over a pair of conductors 317a, 317b which define a duplex data channel 319 in a system bus assembly 316. This additional signal channel is provided to allow system controller 322 and control circuits 328 to conduct bidirectional exchange of data for various purposes, such as for allowing system controller 322 to monitor the status of loads controlled by control modules 314, as well as to provide for identification of the nature of load 30e, and the like.

Figure 5:
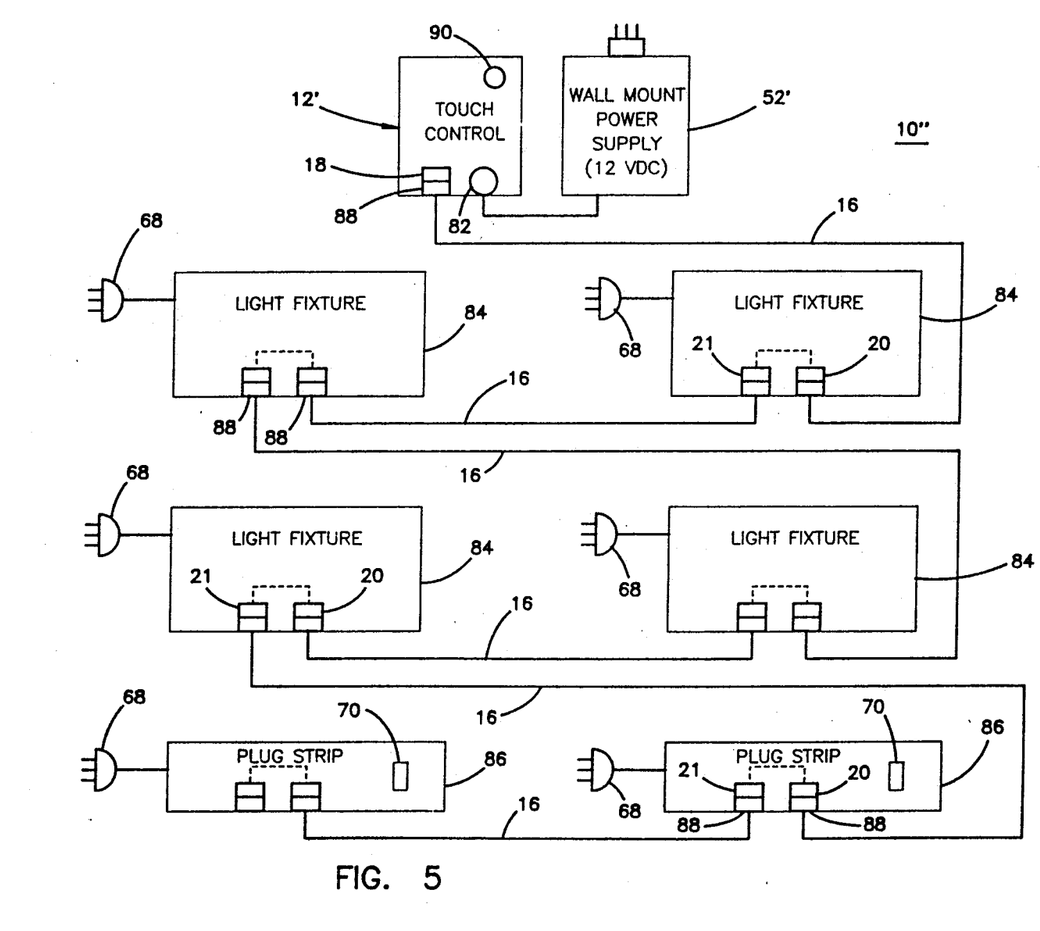
FIG. 5 is a block diagram illustrating the application of an embodiment of the invention to controlling particular loads in a work station.

Although modular network control systems 10, 10' and 310 have been illustrated with individual control modules 14a–14d, 314, it is contemplated that, in typical applications, a plurality of control modules 14a–14d, 314 in various assortments and combinations, will be assembled into a single network. One example is modular network control system 10" configured for controlling the lighting loads and miscellaneous small equipment, such as heaters, fans, computers and the like, of a typical office work station (FIG. 5). Modular network control system 10" is shown as including an input module 12' which incorporates both a touch-responsive keypad and a system controller in a single module. A separate, wall mounted power supply 52' has a conventional low voltage jack 82 which plugs into a receptacle (not shown) in input module 12'. Modular network control system 10" additionally includes a plurality of light fixtures 84 and a plurality of plug strips 86. Each light fixture 84 and plug strip 86 includes an output port 21 which is internally jumpered with its input port 20 in order to place the input and output ports in electrical parallel interconnection. The parallel interconnection of input port 20 and output port 21 on each light fixture 84 and plug strip 86 provides a daisy-chain system configuration by merely interconnecting the input port 20 of a fixture 84 with the output port 18 of control module 12' and by connecting the output port 21 of each light fixture or plug strip with the input port of another fixture or plug strip. Each input port 20 and output port 21 are of identical configuration with each other and with output port 18 of input module 12'. This allows system bus assemblies 16 to have connectors 88 on its opposite end of identical configuration.

Figure 3:
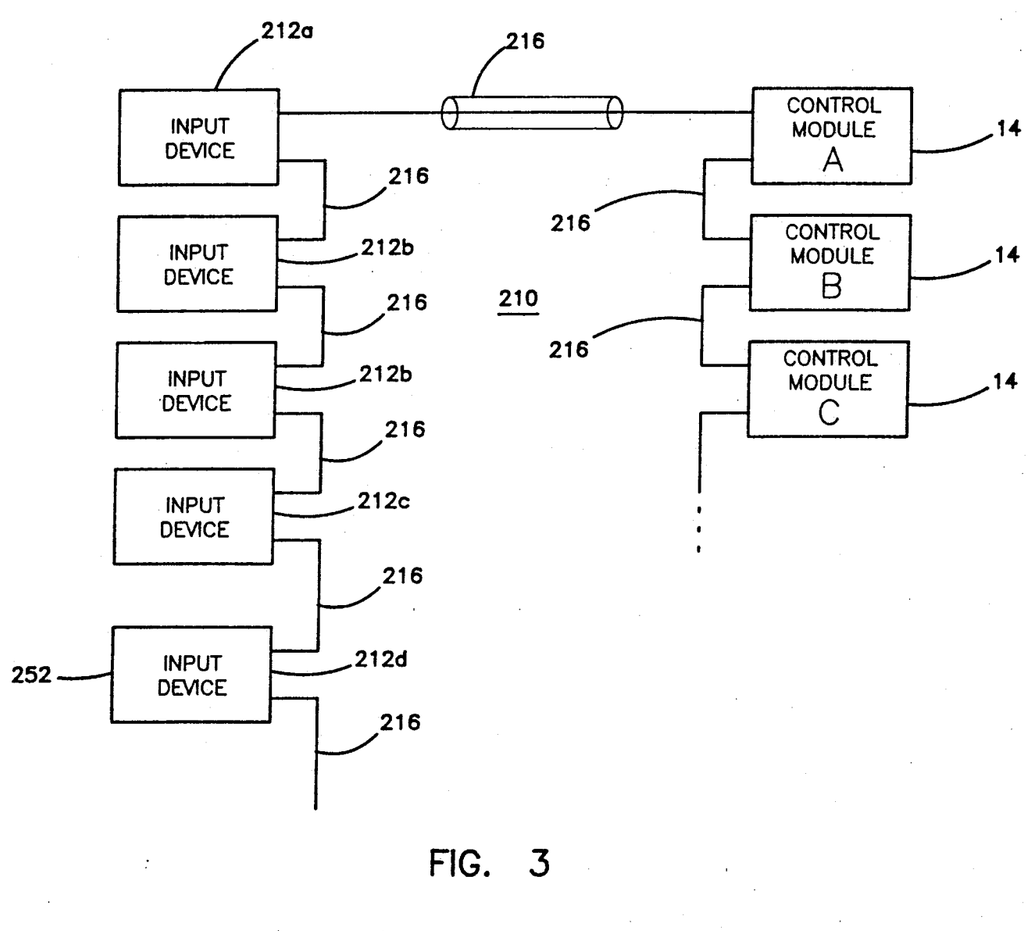

The plug 68 of each light fixture 84 and plug strip 86 is connected with a convenient line voltage power receptacle. However, the activated or non-activated state, or power level, of all light fixtures 84 and plug strips 86 are selected from input module 12'. Each plug strip 86 is illustrated having a manual power switch 70 so that power strips 86 may be used independent of control system 10' as previously set forth. Because the electrical energy required to control each light fixture 84 and plug strip 86 is supplied through control module 12', a second low voltage power input connector 90 is provided with input module 12' in order to receive the output of additional power supplies 52' (not shown), although an additional power supply 252 could be connected directly with a system bus assembly 216, as illustrated in FIG. 3. Alternatively, a power supply 52 could be supplied of higher capacity in order to support additional control modules. In this manner, the control system 10" may be expanded to meet the need and is limited only by the current-carrying capacity of system bus assembly 16.

Figure 7A:
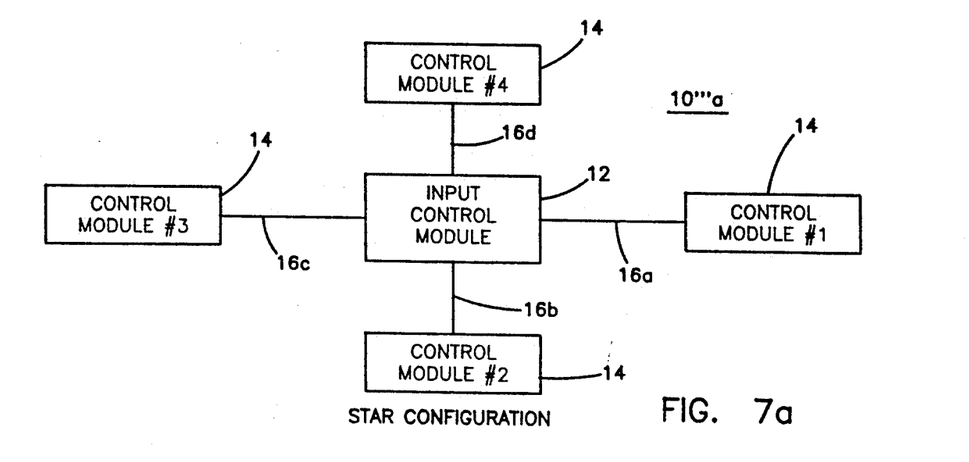
FIGS. 7A and 7B are block diagrams illustrative of basic system configurations.

The modular network control system may be configured in a star configuration 10'''a, illustrated in FIG. 7A, in which separately actuated system bus assemblies 16a, 16b, 16c, 16d extend to one or more separately controlled control modules 14. Star configuration 10'''a allows input module 12 to separately control the actuation of loads through control modules 14 without assigning unique addresses to each control module 14. This may be accomplished by input module 12 applying appropriate low voltage control signals to the system bus assembly 16a–16d extending to the appropriate control modules 14.

Figure 7B:
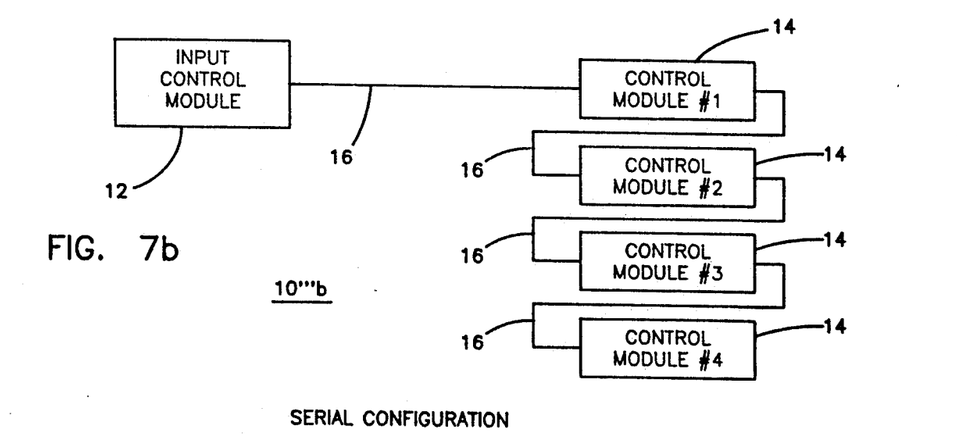

The modular network control system may alternatively be configured in a serial configuration 10'''b, illustrated in FIG. 7B. In the serial configuration, devices 14 are serially connected in the same daisy-chain fashion as control system 10" illustrated in FIG. 5. When configured in a serial configuration, individual loads controlled by control modules 14 may be actuated separately using intelligent control circuits 72, 372 with suitable address commands issued by input module 12, 312 (FIGS. 4B–4E).

Figure 2:
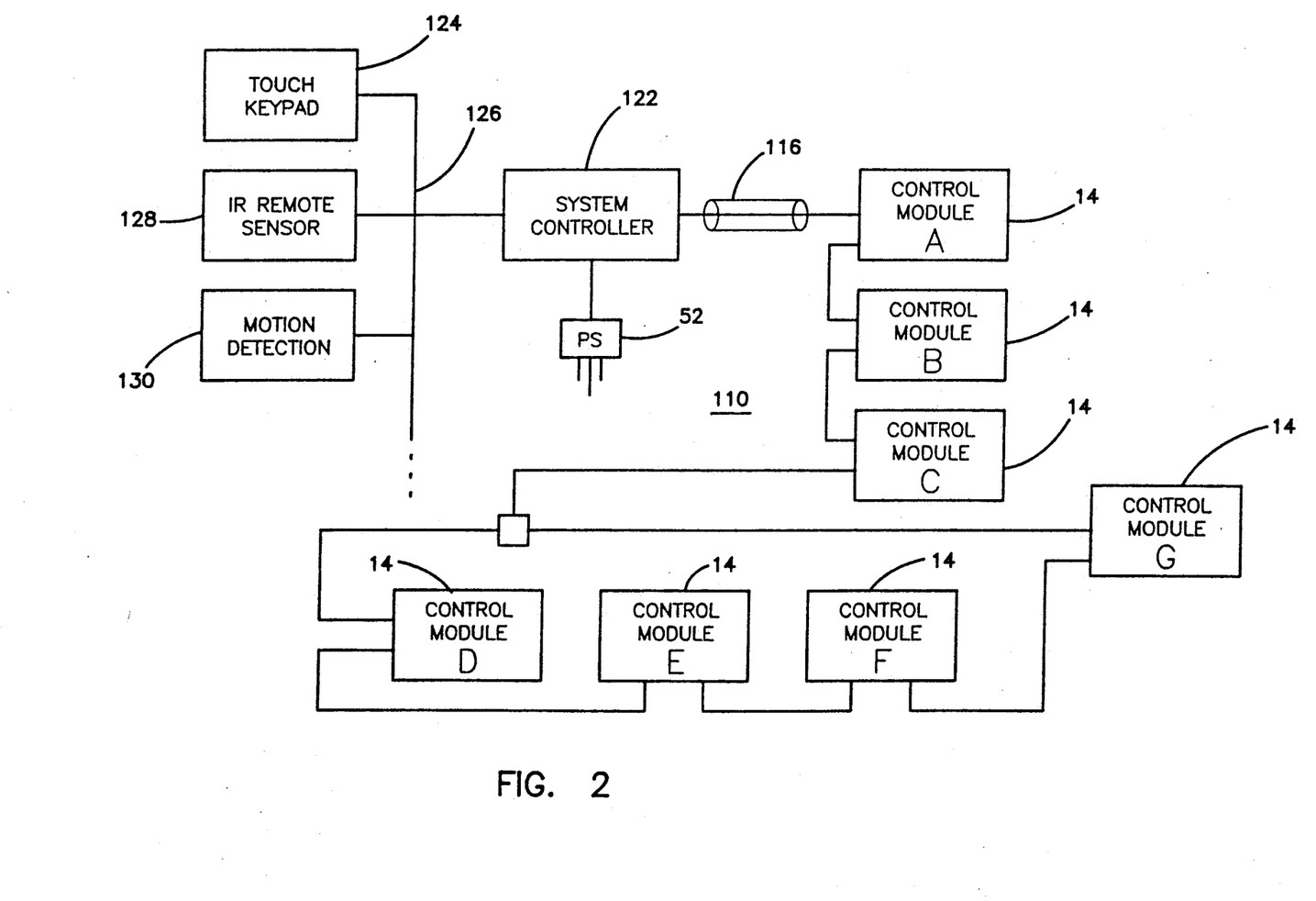

Variations in the configuration of the input module are also possible. In modular network control system 110, illustrated in FIG. 2, the system controller 122 receives input commands from a touch keypad 124 and infrared (IR) remote sensor 128 and a motion detector 130. The outputs of touch keypad 124, IR remote sensor 128 and motion detector 130 are all connected in parallel with line 126 extending to system controller 122. System controller 122 responds nondiscriminately to signals from any of the touch pad 124, IR remote sensor 128 and motion detector 130, by producing low voltage control signals on system bus assembly 116 to drive the loads controlled by the control modules 14. In the illustrated embodiment, each input device 124, 128, 130 produces signals on line 126 which are indistinguishable to system controller 126. In this manner, system controller 122 merely responds to the first signal received on line 126, in order to drive control modules 14, and to the next signal received on line 126, in order to again drive the control modules irrespective of the source of the input. Alternatively, it is possible that the signal produced from touch keypad 124 could be distinguishable from those of IR remote sensor 128 and motion detector 130 so that system controller 122 could be made to distinguish each input and issue appropriate control signals on system bus assembly 116.

In modular network control system 210, illustrated in FIG. 3, input modules 212a, 212b, 212c, and 212d are all connected in a serial configuration using system bus assemblies 216 and can actively control any of the control module 14. This configuration of the network control system allows any of the input modules to specifically address and control any of the control modules 14, or any combination thereof. Power supply 252 can be connected with system bus assembly 216 at any point in the network to supply low voltage power.

Suitably programmed microprocessors, such as model MC68HC05P1 marketed by Motorola, may be used to provide for the generation and recognition of unique address words and control words, as used in network control systems 10'b (FIG. 4B), 10'c (FIG. 4C) and 10'd (FIG. 4D). Integrated circuits which are capable of duplex, or bidirectional, data communication over data channel 319 (FIG. 6A and 4D) are commercially available and marketed by several companies such as Motorola, under Model Nos. MC143120 and MC143150.

Thus, it is seen that the present invention embodied in the illustrative embodiments provides a control system that may be readily installed, especially in the office environment, by the positioning of standard control modules at the desired locations and interconnection of same by a very inconspicuous low voltage cable constituting system bus assembly, that need be supplied in only one configuration, although in different lengths. The unique bus protocol provides the appropriate control signals to each control module in a manner that allows for suitable operation of each control module. Furthermore, the system provides for future expandability by accepting various configurations of control modules in combination with various types of loads to be controlled. The provision for various configurations of input modules and auxiliary power supplies enhances the flexibility of the system.

The present network control system is capable of supplying switched low voltage power to control particular loads that may be actuated in unison. Separate various control functions may be performed on individual loads by connecting with the data channel. In either case, where necessary, low voltage power is available to supply the control circuitry as well as the load, per se, in order to eliminate the necessity for separate power supply in each control module. This is accomplished while minimizing bulk in the system bus assembly. In certain circumstances, loads may be actuated without the necessity of any high voltage input and, hence, can free up the particular load from connection with a wall outlet for yet greater flexibility.

While the present invention is especially useful for use in the office environment, it is not limited to such applications. It may find use in various commercial settings as well as in the home. Changes and modifications in the specifically described embodiments can be carried out without departing from the principles of the invention which is intended to be limited only by the scope of the appended claims, as interpreted according to the principles of patent law, including the Doctrine of Equivalents.

The embodiments of the invention in which an exclusive property or privilege is claimed are defined as follows:

1. A modular electrical control system for controlling office equipment comprising in combination:
   at least one control module including an input port and control means responsive to a command signal at said input port for selectively performing a control function on a load, said load including a particular office equipment device;
   at least one input module including at least one input device for generating an input signal, an output port and a circuit responsive to said input signal for supplying a command signal to said output port, said circuit including a switch control unit that is responsive to a particular state of said input signal by producing a switched low voltage signal and an address and command control unit that is responsive to a particular state of said input signal by producing a particular value of a data signal;

a system bus assembly interconnecting said output port of said at least one input module with said input port of said at least one control module, said system bus assembly including at least two signal channels;

wherein said switched low voltage signal is supplied to one of said signal channels and said data signal is supplied to the other of said signal channels, and wherein said control module is one of a first type in which said control means is responsive to said switched low voltage signal on said one of said signal channels in order to perform a control function on the load connected therewith and a second type in which said control means is responsive to a particular value of said data signal assigned to that control module on said other of said signal channels in order to perform a control function on the load connected therewith, wherein all control modules of said first type will respond concurrently to said switched low voltage signal in order to perform a control function on the load associated therewith and all control modules of said second type will respond individually to assigned values of said data signal in order to perform a control function on the load associated therewith.

2. The control system in claim 1 wherein said data signal includes an address word that is unique to that at least one control module and a control function word indicative of a control function to be performed.

3. The control system in claim 1 including a low voltage power supply connected with said output port and wherein said system bus assembly includes a third channel connected with said low voltage power supply.

4. The control system in claim 3 wherein said at least one control module includes one of a first connection means for supplying electrical energy to a load from a source of high voltage power and a second connection means for supplying electrical energy to said load from said third channel.

5. The control system in claim 1 wherein said system bus assembly includes a third signal channel and wherein said circuit means includes means for selectively communicating bidirectionally over said third signal channel with a third type of said control module.

6. The control system in claim 5 further including a low voltage power supply for producing low voltage power at low voltage terminals thereof, and wherein said system bus assembly includes a fourth signal channel connected with said low voltage terminals.

7. The control system in claim 1 including a plurality of said input means each for generating an input signal supplied to said circuit means.

8. A modular electrical control system comprising in combination:

at least one control module including an input port and control means responsive to a command signal at said input port for selectively performing a control function on a load;

at least one input module including at least one input means for generating an input signal, an output port and circuit means responsive to said input signal for supplying a command signal to said output port;

a system bus assembly interconnecting said output port of said at least one input module with said input port of said at least one control module, said system bus assembly including at least two signal channels;

wherein said circuit means selectively supplies said command signal as one of a switched low voltage signal applied to a first said signal channel and a data signal applied to a second said signal channel, and wherein said at least one control module includes connection means for supplying electrical energy from a source of high voltage power and manual switch means for selectively applying electrical energy from said connection means to said load in order to activate said load, and wherein said control means selectively bypasses said manual switch means in response to said command signal.

9. The control system in claim 8 including a plurality of said control modules electrically connected with said input modules by additional ones of said system bus assembly, wherein any one of said input means includes means for selectively supplying said command signal to substantially any said control module to perform a control function on the associated said load.

10. A modular electrical control system for controlling office equipment comprising in combination:

a plurality of control modules, each of said control modules including an input port and a control circuit connected with said input port and a load in order to perform a control function on the load, said load including a particular office equipment device;

an input module including an input device for receiving a user selection of a control function to be performed on at least one said load, an output port, and a controller that is responsive to said user selection and including a switch control unit that is responsive to a particular user selection by producing a switched low voltage signal at said output port and an address and command control unit that is responsive to any one of a number of different user selections by producing a data signal unique to that selection at said output port;

a plurality of system bus assemblies, each system bus assembly electrically connecting said output port with one said input port and having a first channel supplied with said switched low voltage signal and a second channel supplied with said data signal; and wherein said control circuit is one of a non-selective circuit that is connected with said first channel and a selective circuit that is connected with said second channel, said non-selective circuit being responsive to said switched low voltage signal to perform a control function and said selective circuit being responsive to said data signal to perform a control function provided that said second control signal is encoded with an address that is assigned to the particular control module.

11. The control system in claim 10 wherein each said control module includes an output port that is connected in electrical parallel with said input port of that particular control module whereby said control modules may be connected in a daisy-chain by connecting additional ones of said system bus assemblies between output ports of upstream control modules and input ports of downstream modules.

12. The control system in claim 11 wherein each of said system bus assemblies has connectors of a particular configuration on opposite ends thereof and further wherein said output ports of said input modules and said control modules and said input ports of said control modules have a common configuration, whereby said system bus assemblies may be used interchangeably between said input module and one of said control modules and between any two of said control modules.

13. The control system in claim 10 further including a low voltage power supply for producing low voltage electrical power at low voltage terminals thereof and wherein each of said system bus assemblies includes a third channel connected to said low voltage terminals whereby particular ones of said control circuits are connected with said third channel to receive power therefrom.

14. The control system in claim 13 including means for connecting additional low voltage power supplies to said third channel whereby additional low voltage power supplies may be added in proportion to the number of control modules in said control system.

15. The control system in claim 13 wherein each said system bus assembly includes a pair of substantially identical electrical connectors defining electrical connection means on opposite ends thereof and wherein each of said first, second and third channels is a pair of electrical conductors extending between said pair of substantially identical electrical connectors.

16. The control system in claim 10 wherein said input module includes a plurality of said input means and wherein said controller is responsive to a user selection being received on any of said input means.

17. The control system in claim 16 wherein any one of said input means includes means for selectively supplying said second control signal encoded with said address for substantially any of said control modules to perform a control function.

18. The control system in claim 10 wherein said first control signal is a low voltage DC level that is selectively applied.

19. The control system in claim 10 wherein said second control signal is further encoded with a control function word that corresponds to a control function to be performed.

20. A modular electrical control system comprising in combination:
- a plurality of control modules, each of said control modules including an input port and a control circuit connected with said input port and a load in order to perform a control function on the load;
- an input module including input means for receiving a user selection of a control function to be performed on at least one said load, an output port, and a controller that is responsive to said user selection to supply at least one of a first and second control signal to said output port;
- a plurality of system bus assemblies, each system bus assembly electrically connecting said output port with one said input port and having a first channel for said first control signal and a second channel for said second control signal;
- wherein said control circuit is one of a non-selective circuit that is connected with said first channel and a selective circuit that is connected with said second channel, said non-selective circuit being responsive to said first control signal to perform a control function and said selective circuit being responsive to said second control signal to perform a control function provided that said second control signal is encoded with an address that is assigned to the particular control module; and
- wherein at least one said control circuit includes connection means for supplying electrical energy from a source of high voltage power and manual switch means for selectively applying electrical energy from said connection means to the respective said load in order to activate said load and wherein said control circuit selectively bypasses said manual switch means in response to one of said first and second control signals.

21. The control system in claim 20 wherein each said system bus assembly includes a third channel and wherein particular ones of said control circuit are connected with said third channel and include means for communicating bidirectionally with said input module over said third channel.

22. The control system in claim 20 further including a low voltage power supply for producing low voltage electrical power and supplying said low voltage electrical power at low voltage terminals thereof, and wherein each of said system bus assemblies includes a third channel connected to said low voltage terminals, whereby particular ones of said control circuits are connected with said third channel to receive low voltage electrical power therefrom.

23. A modular electrical control system for controlling office equipment comprising in combination:
- a plurality of control modules, each of said control modules including an input connector, an output connector, and a control circuit connected with said input connector, said output connector and said load in order to perform a control function on the load, said load including a particular office equipment device;
- an input module that is adapted to receiving a user selection of a given control function to be performed by at least one of control modules, an output connector, a low voltage power supply that is adapted to supplying low voltage electrical power to said output port and a controller that is responsive to said user selection and including a switch control that is responsive to a particular user selection by producing a switched low voltage signal at said output port and an address and command control that is responsive to any one of a number of different user selections by producing a data signal unique to that selection at said output port;
- a plurality of bus assemblies, each system bus assembly having connection means on opposite ends for electrically connecting said output connector of said input module and said plurality of control modules with one said input connector and having a first channel supplied with said switched low voltage signal, a second channel supplied with said data signal and a third channel supplied with said low voltage electrical power; and
- wherein particular ones of said control circuits are connected with said first channel and respond to said switched low voltage signal to perform said given control function and particular ones of said control circuit are connected with said second channel and respond to said data signal to perform said given control function provided that said second control signal is encoded with an address that is unique to that control module, and further wherein particular ones of said control circuits are connected with said third channel and are powered from said low voltage power supply.

24. The control system in claim 23 wherein said output connector of each control module is connected in electrical parallel with the input connector of that control module whereby said control modules may be connected in daisy-chain.

25. The control system in claim 23 wherein said output connectors of said input modules and said control modules and said input connectors of said control modules have a common configuration whereby said system bus assemblies may be used interchangeably between said input module and one of said control modules and between two of said control modules.

26. The control system in claim 23 including means for connecting additional low voltage power supplies to said third channel whereby additional low voltage power supplies may be added in proportion to the number of control modules in said control system.

27. The control system in claim 23 wherein each said system bus assembly includes a pair of identical electrical connectors defining said connection means and wherein each of said first, second and third channels is a pair of electrical conductors.

28. The control system in claim 23 wherein each said system bus assembly includes a fourth channel and wherein particular ones of said control circuit are connected with said fourth channel and includes means for communicating bidirectionally with said input module over said fourth channel.

29. A modular electrical control system comprising in combination:
a plurality of control modules, each of said control modules including an input connector, an output connector, and a control circuit connected with said input connector, said output connector and said load in order to perform a control function on the load;
an input module that is adapted to receiving a user selection of a given control function to be performed by at least one of control modules, an output connector, a low voltage power supply that is adapted to supplying low voltage electrical power to said output port and a controller that is responsive to said user selection to supply at least one of a first and second control signal to said output port;
a plurality of bus assemblies, each system bus assembly having connection means on opposite ends for electrically connecting said output connector of said input module and said plurality of control modules with one said input connector and having a first channel for said first control signal, a second channel for said second control signal and a third channel for said low voltage electrical power;
wherein particular ones of said control circuits are connected with said first channel and respond to said first control signal to perform said given control function and particular ones of said control circuit are connected with said second channel and respond to said second control signal to perform said given control function provided that said second control signal is encoded with an address that is unique to that control module, and further wherein particular ones of said control circuits are connected with said third channel and are powered from said low voltage power supply; and
wherein at least one said control module includes connection means for supplying electrical energy from a source of high voltage power and manual switch means for selectively applying electrical energy from said connection means to the respective said load in order to activate said load and wherein said control circuit selectively bypasses said manual switch means in response to one of said first and second control signals.

30. The control system in claim 29 wherein said first control signal is a low voltage DC level that is selectively applied.

31. The control system in claim 29 wherein said second control signal is further encoded with a control function word that corresponds to a control function to be performed.

* * * * *

UNITED STATES PATENT AND TRADEMARK OFFICE
CERTIFICATE OF CORRECTION

PATENT NO. : 5,289,365
DATED : February 22, 1994
INVENTOR(S) : David W. Caldwell and Nicholas W. Medendorp It is certified that error appears in the above-indentified patent and that said Letters Patent is hereby corrected as shown below:

Column 2, line 6:
    After "channel" insert --.--.

Signed and Sealed this

Twenty-seventh Day of September, 1994

Attest:

BRUCE LEHMAN

Attesting Officer        Commissioner of Patents and Trademarks